March 11, 1952  R. LAPSLEY  2,588,855
GEAR CLUTCH MECHANISM
Filed May 28, 1948
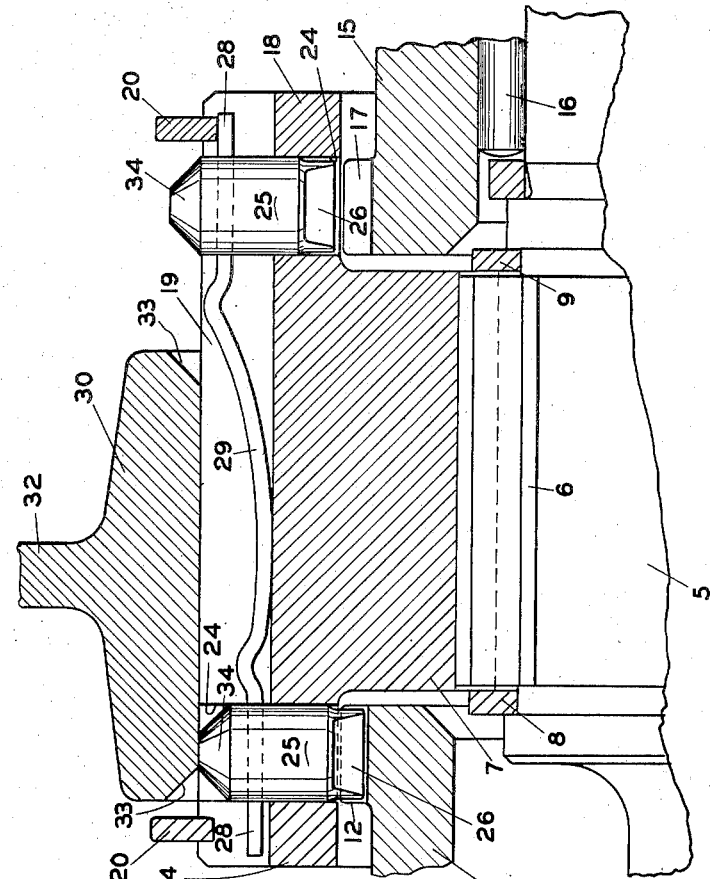
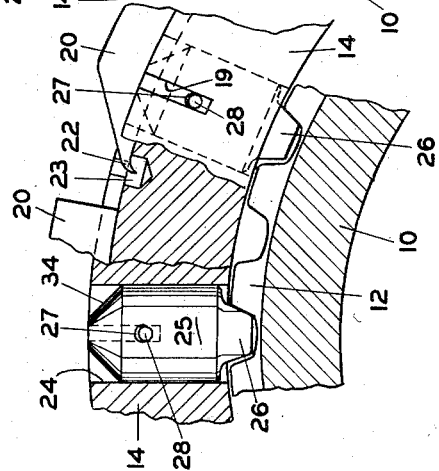
INVENTOR.
ROBERT LAPSLEY
BY
ATTY.

Patented Mar. 11, 1952

2,588,855

UNITED STATES PATENT OFFICE 2,588,855

GEAR CLUTCH MECHANISM

Robert Lapsley, Berrien Springs, Mich., assignor to Clark Equipment Company, Buchanan, Mich., a corporation of Michigan Application May 28, 1948, Serial No. 29,911

11 Claims. (Cl. 192—48)

This invention relates to gear clutching mechanisms and more particularly is concerned with a clutch mechanism for selectively clutching either of two coaxially mounted gears to a rotating shaft. The device is designed mainly for use in connection with change speed gear transmission and other power transmitting mechanisms where it is desired to provide for selective clutching of either of two axially spaced gears to a common shaft.

Heretofore, this has been accomplished by the use of a hub member splined on the shaft and carrying annular dental clutch teeth, this member being adapted to be shifted axially on the shaft to bring the teeth at either end thereof selectively into engagement with corresponding clutch teeth carried by the adjacent gears. With devices of this type, however, increased axial length is provided in order to accommodate the sliding action of the clutch hub from neutral position in either direction into engaged position. The present invention is a modification of the type of rocker clutch mechanism disclosed in the co-pending application of Donald S. Dence, Serial #543,512, filed July 5, 1944, now Patent No. 2,447,058, issued August 17, 1948, and more particularly is directed to the use of a plurality of circumferentially arranged poppet gear members disposed in radial overlapping relationship to corresponding clutch teeth carried by the two gears which are to be selectively engaged.

These poppet members are arranged for radial movement inwardly and outwardly relative to the corresponding gear members, their action being controlled by an intermediate rocker member and an annular actuating sleeve surrounding the carrier member in which the poppets are disposed.

With this type of construction, it is apparent that the encircling collar member, when it has cammed the poppet members into engagement, acts as a band preventing their release and therefore providing positive clutching action which will not walk out of gear as has occurred with the sliding clutch action of previous devices. Also, by the use of the intermediate rocking member, the opposite series of poppets are automatically raised out of position to disengage the other gear to release it for free rotation. The intermediate rocking member is disposed in axially directed slots extending circumferentially about an intermediate hub member disposed between the gears and which is fixed upon the shaft.

The construction is of very simplified design and is capable of quick and easy assembly and yet is positive in action.

Other objects and advantages of the present invention will appear more fully from the following detailed description, which, taken in conjunction with the accompanying drawing, will disclose to those skilled in the art, the particular construction and operation of a preferred form of the present invention.

In the drawing:

Figure 1 is a vertical sectional view through a clutch mechanism embodying the present invention; and Figure 2 is a transverse sectional view taken at one end of the clutch mechanism with portions broken away for the sake of clarity.

Referring now in detail to the drawings, there is provided a shaft 5, having an intermediate splined portion 6, upon which is mounted a corresponding splined hub portion of a body member 7, held against axial shifting movement by means of snap rings 8 and 9, seated against shoulders formed in the shaft 5.

On one side of the shaft 5, there is provided a gear member 10, which is rotatably mounted coaxially of the shaft and which is provided with external clutch teeth 12, adjacent the overhanging portion 14 of the body member 7. On the opposite side of the splined portion of the shaft portion 5, there is provided a gear member 15 mounted upon the bearings 16 for rotation about the shaft 5, and having external clutch tooth portions 17 disposed radially within the opposite overhanging portion 18 of the body member 7.

The body member 7 is provided about its periphery with a series of circumferentially spaced axially directed slots 19, extending for the full length thereof. Adjacent the ends of these slots, there are provided snap rings 20, seated in channels formed in the periphery of the body member 7, the snap rings 20 having tab portions 22 depressed into recesses 23 formed in the body member 7 to prevent rotation of the snap rings after they have been fixed in position.

The overhanging portions 14 and 18 of the body member 7 are provided inwardly of the snap rings 20, with a series of circumferentially spaced radially directed bores 24, as shown in detail in Figure 2, within which are disposed poppet members 25. Each of the poppet members 25 has a conical upper head portion providing a cam surface, the purpose of which is to be described hereinafter, and a lower tooth formed portion 26, which is flatted on the sides and is adapted to extend into the spaces between the teeth 12 of the gear 10 and the teeth 17 of the gear 15. The poppet members are provided with transverse apertures 27 extending therethrough, which apertures are adapted to receive the extending ends 28 of a rocker member, indicated generally at 29, which is fulcrumed within the slots 19 intermediate the poppet members. The member 29 may be a wire spring-like member as disclosed in the drawing, or may be a piece of strap or bar stock having its ends formed to be received within suitable apertures in the poppets to provide the rocking action.

This action is desired inasmuch as in the operation of this mechanism, it is necessary to provide a holding force on one series of poppets when the other series is to be engaged with the associated clutch gear teeth.

Mounted for axial sliding movement about the periphery of the member 7 is a shifter hub 30, having a flange portion 32 adapted to be engaged by a shifter fork or the like. The hub 30 is arranged so that when in an intermediate position between the two series of poppet members, it will not be in contact with either series. It is provided at each end with internal chamfered portions 33, as shown in Figure 1, which have the same angle of surface as the conical surfaces 34 of the poppets. Thus, when the member 32 is shifted from its intermediate neutral position into the position shown in Figure 1, the surface 33 at the left hand end thereof, engages the conical surface 34 of the poppets 25 carried at the left hand side of the member 7, and cams these poppets radially inwardly into engagement between the teeth 12 of the gear 10.

It will be noted that the angular relationship of the flat surfaces 26 at the radial inner ends of the poppets 25 with respect to the corresponding tooth surfaces of the teeth 12 and 17, is such that there is a camming action normally tending to move the poppets radially outwardly out of clutching engagement. This action assists the rocker member 29 in raising the poppets whenever the hub 30 is disposed in a position to allow the poppets to move radially outwardly. This camming action between the teeth and the inner ends of the poppets insures that the poppets will be forced out of engaging position whenever the encircling hub 30 is removed from its overlying position about the outer ends of the poppets.

Due to the rocking action of the rocker member 29, there is a corresponding lifting movement exerted on the poppets 25 at the opposite end 18 of the member 7, causing these poppets to be moved radially outwardly so that the tooth portions 26 thereof, are held out of engagement with the teeth 17 of the gear 15, thereby allowing the gear 15 to have free rotation on the shaft 5.

The snap rings 20, as will be seen, provide stop means for limiting the outward movement of the ends 28 of the rocker members so as to prevent the poppets being displaced out of the bores 19. As the member 32 is shifted from the position shown in Figure 1 to the right, the encircling portion thereof, extending over the ends of the poppets 25 at the left hand side of the member 7, is withdrawn and the action of the rocking member 29 thereby raises these poppets out of tooth engaging position to a point where the left hand end 28 of the member 29 engages the inner periphery of the associated snap ring 20. In this intermediate position, both series of poppets are out of engagement and the device is in neutral position.

As the member 30 continues to move to the right, the right hand end cam surface 33 thereof, engages the corresponding surface 34 of the right hand series of poppets 25, camming them radially inwardly to engagement with the teeth 17 of the gear 15, to lock this gear to the member 7 and consequently to the shaft 5.

I am aware that various changes can be made in certain details of the present construction without in any way departing from the underlying principles of the present invention, and I therefore do not intend to be limited except as defined by the scope and spirit of the appended claims.

I claim:

1. In combination, a shaft, a pair of axially spaced gears rotatably mounted coaxially with said shaft and having adjacent annular clutch tooth portions, a member splined on said shaft intermediate said gears and having portions radially overhanging said clutch portions, an annular series of radially movable cylindrical poppets in each of said overhanging portions, rocker means carried by said member interconnecting said poppets axially and including means for holding them against rotation, the inner ends of said poppets having tooth engaging portions, and means axially shiftable on said member for selectively camming either series of poppets radially inwardly into engagement with the clutch tooth portion of the associated gear, said rocker means assisting in maintaining the other series of poppets radially out of engaging position with the other of said gears.

2. The combination, with a pair of axially spaced rotatably mounted coaxial gears, having clutch tooth portions at their adjacent ends, of an intermediate member having opposite end portions radially overhanging said tooth portions, circumferentially spaced axially directed slots in the periphery of said member, an annular series of radially movable poppet members in each overhanging portion having tooth engaging portions at their inner ends and cam surfaces at their outer ends, an axially shiftable member for selectively camming either series of poppets radially inwardly into tooth-engaging position with the associated gear, and individual spring members having their ends engaging said poppet members and extending through each of said slots and fulcrumed therein intermediate their ends for maintaining the other series of poppets out of engaging position.

3. In combination, a pair of axially spaced coaxially rotatable gears having clutch tooth portions at adjacent ends, an intermediate member having opposite end portions radially overhanging said tooth portions, axially directed circumferentially spaced slots in said members, radially movable poppets in each end of said member having tooth-engaging portions at the inner ends thereof and cam surfaces at the outer ends thereof and having an intermediate transverse aperture, resilient rocker means in said slots having end portions projecting through said apertures to hold said poppets against rotation, means on the ends of said member engaged by said rocker ends limiting outward movement of said poppets, and axially shiftable means selectively operable to cam either series of poppets radially inwardly into tooth-engaging position.

4. In combination, a pair of axially spaced coaxially rotatable gears having clutch tooth portions at adjacent ends, an intermediate member having opposite end portions radially overhanging said tooth portions, axially directed circumferentially spaced slots in said member, radially movable poppets in each end of said member having tooth-engaging portions at the inner ends thereof and cam surfaces at the outer ends thereof and having an intermediate transverse aperture, resilient rocker means in said slots having end portions projecting through said apertures to hold said poppets against rotation, means on the ends of said member engaged by said rocker ends limiting outward movement of said poppets, and axially shiftable means selectively operable to cam either series of poppets radially inwardly into tooth-engaging position, and adapted to slide over the cammed series of poppets to hold them against release from engaging position.

5. In combination, a shaft, a gear fixed axially relative to said shaft but rotatable coaxially relative thereto, a member non-rotatable on said shaft having a portion radially overhanging one end of said gear clutch tooth portion on said end of said gear, circumferentially spaced, radially shiftable cylindrical poppets in said overhanging portion having inner tooth-engaging ends and cam surfaces on the outer ends, axially shiftable means on said member for camming said poppets radially inwardly into tooth-engaging position, and resilient means carried by said member for maintaining said poppets out of tooth-engaging position when said shiftable means is out of camming position.

6. In combination, a shaft, a gear fixed axially relative to said shaft but rotatable coaxially relative thereto, a member non-rotatable on said shaft having a portion radially overhanging one end of said gear clutch tooth portion on said end of said gear, circumferentially spaced, radially shiftable cylindrical poppets in said overhanging portion having inner tooth-engaging ends and cam surfaces on the outer ends, axially shiftable means on said member for camming said poppets radially inwardly into tooth-engaging position, and resilient means carried by said member for maintaining said poppets out of tooth-engaging position when said shiftable means is out of camming position and means carried by said member limiting outward movement of said poppets.

7. In combination, a shaft, a gear fixed axially relative to said shaft but rotatable coaxially relative thereto, a member non-rotatable on said shaft having a portion radially overhanging one end of said gear clutch tooth portion on said end of said gear, circumferentially spaced, radially shiftable cylindrical poppets in said overhanging portion having inner tooth-engaging ends and cam surfaces on the outer ends, axially shiftable means on said member for camming said poppets radially inwardly into tooth-engaging position, and wire spring means carried by said member, said poppets having transverse apertures therethrough receiving the ends of said spring means.

8. In combination, a shaft, a gear axially fixed on said shaft but free to rotate thereon and having a gear clutch tooth portion at one side thereof, a hub member fixed on said shaft having an annular portion overhanging said gear portion, an annular series of radially movable cylindrical poppets supported in said overhanging portion and having clutch tooth engaging portions at their inner ends and cam surfaces at their outer ends, axially slidable means on said hub member for camming said poppets radially inwardly into clutching engagement with said gear, and means for preventing rotation of said poppets about their axes.

9. For use with a shaft having a pair of axially spaced gears rotatably mounted thereon and with each gear including annular clutch tooth portions, the combination of a member splined on the shaft intermediate the gears and having portions radially overhanging the clutch tooth portions, an annular series of radially movable cylindrical poppets in each of said overhanging portions, rocker means carried by said member interconnecting said poppets axially and including means for holding them against rotation, the inner ends of said poppets having tooth engaging portions, and means axially shiftable on said member for selectively camming either series of poppets radially inwardly into engagement with the clutch tooth portions of the associated gear, said rocker means assisting and maintaining the other series of poppets radially out of engaging positions with the other of the gears.

10. For use with a pair of axially spaced coaxially rotatable gears having clutch tooth portions at adjacent ends, the combination of an intermediate member having opposite end portions radially overhanging the clutch tooth portions of the axially spaced gears, axially directed circumferentially spaced slots in said member, radially movable poppets in each end of said member having tooth engaging portions at the inner ends thereof and cam surfaces at the outer ends thereof and having an intermediate transverse aperture, resilient rocker means in said slots having end portions projecting through said apertures to hold said poppets against rotation, means on the ends of said member engaged by said rocker ends limiting outward movement of said poppets, and axially shiftable means selectively operable to cam either series of poppets radially inwardly into tooth engaging position.

11. For use with a shaft having a gear fixed axially relative to the shaft but rotatable coaxially relative thereto and with the gear including an annular clutch tooth portion, the combination of a member nonrotatable on the shaft having a portion radially overhanging the clutch tooth portion of the gear, circumferentially spaced radially shiftable cylindrical poppets in said overhanging portion having inner tooth engaging ends and cam surfaces on their outer ends, axially shiftable means on said member for camming said poppets radially inwardly into tooth engaging position, and resilient means carried by the said member for maintaining said poppets out of tooth engaging position when said shiftable means is out of camming position.

ROBERT LAPSLEY.

REFERENCES CITED

The following references are of record in the file of this patent:

UNITED STATES PATENTS

| Number | Name | Date |
|---|---|---|
| 2,447,058 | Dence | Aug. 17, 1948 |
| 2,459,361 | Carnagua et al. | Jan. 18, 1949 |
| 2,498,399 | Dodge | Feb. 21, 1950 |